(12) United States Patent
Shiraki et al.

(10) Patent No.: US 6,201,082 B1
(45) Date of Patent: Mar. 13, 2001

(54) FLUORINE-CONTAINING MACROAZO COMPOUND

(75) Inventors: Kazuo Shiraki; Nobutaka Shimamura, both of Kawagoe (JP)

(73) Assignee: Wako Pure Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/410,049

(22) Filed: Oct. 1, 1999

Related U.S. Application Data

(62) Division of application No. 08/863,571, filed on May 27, 1997, now Pat. No. 5,994,486.

(30) Foreign Application Priority Data

May 31, 1998 (JP) .................................................. 8-160838

(51) Int. Cl.$^7$ ...................................................... C08F 4/04
(52) U.S. Cl. ........................ 526/209; 526/215; 526/219.1
(58) Field of Search ..................................... 516/209, 215, 516/219.1

(56) References Cited

U.S. PATENT DOCUMENTS 3,775,386   11/1973   Citron .

FOREIGN PATENT DOCUMENTS 2-167375   6/1990   (JP) .

OTHER PUBLICATIONS

Bessiere, Jean Marie et al., "Synthese et Caracterisation d'Amorceurs Azoiques Fluores. Application a l'Etude de la Reaction de Terminaison de Chaine lors de la Polymerisation Radicalaire du Styrene," *European Polymers Journal*, vol. 31, No. 6, pp. 573–580, 1995.

DeSimone, J.M. et al., "Dispersion Polymerizations in Supercritical Carbon Dioxide," *Science*, vol. 265, pp. 356–359, Jul. 15, 1994.

*Primary Examiner*—Robert Dawson
*Assistant Examiner*—D. Aylward
(74) *Attorney, Agent, or Firm*—Oliff & Berridge, PLC

(57) ABSTRACT

A fluorine-containing macroazo compound having a fluorine segment in the molecule is useful as a polymerization initiator for producing, for example, fluorine-containing block polymers.

7 Claims, No Drawings

FLUORINE-CONTAINING MACROAZO COMPOUND

This appln is a Div. of Ser. No. 08/863,571 filed May 27, 1997, U.S. Pat. No. 5,994,486.

BACKGROUND OF THE INVENTION

The present invention relates to a fluorine-containing macroazo compound having a fluorine segment in the molecule thereof, which is useful, for example, as a polymerization initiator or the like.

In recent years, polymeric materials have become used in more and more diversified fields, and with this trend, the properties required of polymers are also being diversified. Particularly, polymers having a perfluoroalkylene group (Rf group) in the molecule thereof are noticed with interest because the Rf group part having a low surface free energy is concentrated into the surface region of the polymer to exhibit excellent water-repellency, oil-repellency, heat resistance, weather resistance, slipping characteristics, and the like.

Hitherto, it has been attempted to introduce an Rf group-containing polymer into base material by the method of blending or the like. Such attempts, however, have not given a sufficient effect.

Thus, introduction of Rf group into polymer molecule is being attempted by various methods.

For example, a method of introducing Rf group by the reaction of a polymer formed by living anionic polymerization with an Rf group-containing alkyl halide has been reported in Polymer Preprints Japan., 44, 948 (1995), etc.

Further, methods for producing a polymer having a fluorine segment by polymerization reaction of a fluorine-containing monomer have also been disclosed. Particularly, a synthesis of block polymer using a monomer having a perfluoroalkylene group is being studied energetically because this method makes it possible to introduce perfluoroalkylene group into molecule in a high efficiency and a high concentration.

However, the method of reacting a polymer with Rf group-containing alkyl halide is limited in the kind of polymer usable, and therefore is low in reactivity. On the other hand, the method of polymerizing a fluorine-containing monomer is disadvantageous in that fluorine segment cannot be introduced into an intended site of polymer molecule and a block polymer cannot be obtained.

As a means for solving the above-mentioned problems, it has been attempted to introduce a fluorine segment through a condensation reaction between a prepolymer having fluorine-containing alkylene group and a polymer.

This method, however, cannot introduce fluorine segment in a high yield because the prepolymer having a fluorine-containing alkylene group is low in solubility.

SUMMARY OF THE INVENTION

In view of above, an object of the present invention is to provide a fluorine-containing macroazo compound useful for introducing a fluorine segment into a polymer, and a block polymer having, in the molecule thereof, a fluorine segment derived from said fluorine-containing macroazo compound.

The present invention provides a fluorine-containing macroazo compound comprising repeating units represented by the following formula:

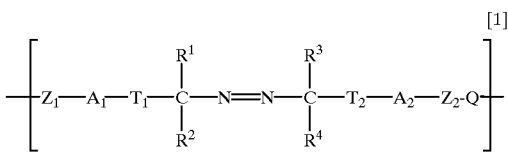

wherein
$R^1$ and $R^3$ independently represent a lower alkyl group;
$R^2$ and $R^4$ independently represent a lower alkyl group or a cyano group;
$A_1$ and $A_2$ independently represent a lower alkylene group which may contain one or more oxygen atoms and/or an aromatic ring;
$Z_1$ and $Z_2$ independently represent an ester linkage or an amido linkage;
$T_1$ and $T_2$ independently represents —CONH— or a direct link; and
Q represents a fluorine-containing segment.

The present invention also provides a process for producing the fluorine-containing macroazo compound mentioned above by reacting an azo compound with a fluorine-containing compound.

The present invention further provides a macroazo initiator containing the above-mentioned fluorine-containing macroazo compound.

Further, the present invention provides a process for producing a fluorine-containing block polymer by polymerizing a monomer by the use of the above-mentioned fluorine-containing macroazo compound.

Further, the present invention provides a fluorine-containing block polymer containing units (or a segment) derived from the above-mentioned fluorine-containing macroazo compound and monomer units as constituents thereof.

DESCRIPTION OF THE PREFERRED EMBODIMENTS

The fluorine-containing macroazo compound of the present invention is characterized by having repeating units represented by the following formula [1]:

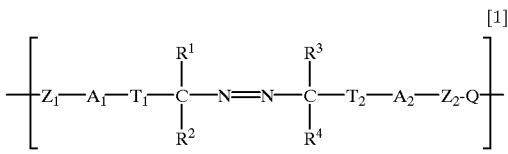

wherein
$R^1$ and $R^3$ independently represent a lower alkyl group;
$R^2$ and $R^4$ independently represent a lower alkyl group or a cyano group;
$A_1$ and $A_2$ independently represent a lower alkylene group which may contain one or more oxygen atoms and/or an aromatic ring at an end or both ends of the alkylene group or interposed in the alkylene group;
$Z_1$ and $Z_2$ independently represent an ester linkage or an amido linkage;
$T_1$ and $T_2$ independently represent —CONH— or a direct link; and
Q represents a fluorine-containing segment.

In the formula [1], the lower alkyl group represented by $R^1$ to $R^4$ may be linear or branched chain lower alkyl groups, and examples thereof include alkyl groups having 1–6 carbon atoms. Specific examples thereof include a methyl group, an ethyl group, a n-propyl group, an isopropyl group, a n-butyl group, an isobutyl group, a tert-butyl group, a sec-butyl group, a n-pentyl group, an isopentyl group, a neopentyl group, a tert-pentyl group, a 3,3-dimethylbutyl group, a 1,1-dimethylbutyl group, a 1-methylpentyl group, a n-hexyl group, an isohexyl group and the like. The lower alkylene group represented by $A_1$ and $A_2$ which may contain one or more oxygen atoms and/or an aromatic ring may be linear or branched chain lower alkylene groups, of which examples include alkylene groups having 1–6 carbon atoms. When said lower alkylene group has one or more oxygen atoms, lower alkylene groups having —O— group in a number of one or more, preferably 1–5 more preferably 1–3 at one end or both ends of the alkylene group (or chain) or at any position in the alkylene chain can be referred to. When said lower alkylene group has an aromatic ring, lower alkylene groups having an aromatic ring such as a phenylene group, a diphenylene group or the like at one end or both ends or in the alkylene chain can be referred to. Specific examples of such lower alkylene groups include a methylene group, an ethylene group, a propylene group, a butylene group, a 2-methylpropylene group, a pentylene group, a 2,2-dimethylpropylene group, a 2-ethylpropylene group, a hexylene group, a —CH$_2$—C$_6$H$_4$— group, an o-xylen-α,α'-diyl group, a —O—CH$_2$— group, a —O—CH$_2$CH$_2$— group, a —CH$_2$—O—CH$_2$— group, a —CH$_2$CH$_2$—O—CH$_2$— group, a —CH$_2$CH$_2$—O—CH$_2$CH$_2$— group, a —CH$_2$CH$_2$—O—CH$_2$CH$_2$—O—CH$_2$CH$_2$— group, a —CH$_2$—O—C$_6$H$_4$— group and the like, although the invention is not limited by these examples. As the ester linkage represented by $Z_1$ and $Z_2$, —COO— and —OCO— can be referred to. As the amido linkage, —CONH— and —NHCO— can be referred to.

As the fluorine-containing segment represented by Q, for example, fluorine-containing oxyalkylene groups represented by the following formula [2] can be referred to:

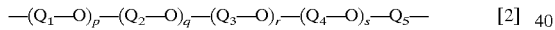

wherein $Q_1$ and $Q_4$ independently represent an alkylene group;

$Q_2$ and $Q_3$ independently represent a fluorine-containing alkylene group;

$Q_5$ represents an alkylene group or a fluorine-containing alkylene group;

p and s independently represent 0 or a natural number e.g., 1 to 1000; and q and r independently represent a natural number, e.g., 1 to 1000.

In the formula [2], the alkylene group represented by $Q_1$, $Q_4$ and $Q_5$ may be linear, branched chain or cyclic alkylene groups, and examples thereof are alkylene groups having 1–10 carbon atoms. Specific examples thereof include a methylene group, an ethylene group, a propylene group, a butylene group, a 2-methylpropylene group, a pentylene group, a 2,2-dimethylpropylene group, a 2-ethylpropylene group, a hexylene group, a heptylene group, an octylene group, a 2-ethylhexylene group, a nonylene group, a decylane group, a cyclopropylene group, a cyclopentylene group, a cyclohexylene group and the like. Of these alkylene groups, preferred are lower alkylene groups having 1–6 carbon atoms. As the fluorine-containing alkylene group represented by $Q_2$, $Q_3$ and $Q_5$, alkylene groups prepared by replacing at least one hydrogen atom of the above-mentioned alkylene groups with one or more fluorine atoms can be referred to, which include the alkylene groups prepared by wholly replacing the hydrogen atoms of the above-mentioned alkylene groups with fluorine atoms, too. As said fluorine-containing alkyl groups, those prepared by replacing hydrogen atom of the above-mentioned alkylene groups with one or more fluorine atoms can be referred to, of which examples include a fluoromethylene group, a fluoroethylene group, a fluoropropylene group, a fluorobutylene group, a fluoropentylene group, a fluorohexylene group, a difluoromethylene group, a difluoroethylene group, a difluoropropylene group, a trifluoropropylene group, a fluorocyclohexylene group, a trifluoroethylene group, a pentafluoroethylene group, a perfluoropropylene group, a perfluoro-2,2-dimethylpropylene group, a perfluoro-2-ethylpropylene group, a perfluorohexylene group, a perfluorocyclopropylene group, a perfluorocyclopentylene group, a perfluorocyclohexylene group and the like. Of these fluorine-containing alkylene groups, preferred are perfluoroalkylene groups having 1–6 carbon atoms.

The molecular weight of the fluorine-containing segment is appropriately selected usually from a range of 100–50,000, preferably from a range of 500–25,000, and more preferably from a range of 1,000–10,000.

The degree of polymerization (n) of the fluorine-containing macroazo compound comprising the recurring unit of the present invention represented by the formula [1] is usually 2 or above, preferably 2–100, and more preferably 2–50.

The fluorine-containing macroazo compound of the present invention comprising the repeating units represented by formula [1] can be produced, for example, in the following manner.

An azo compound represented by the following formula [3]:

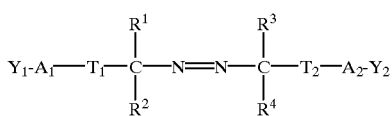

is reacted with, for example, a fluorine-containing compound which has terminal groups reactive with $Y_1$ and $Y_2$, e.g. a fluorine-containing ether compound represented by the following formula [4]:

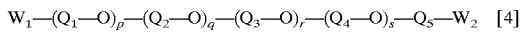

in an appropriate solvent, if necessary in the presence of a basic catalyst, by the use of a dehydrating agent, and optionally in an inert gas atmosphere, whereby the intended fluorine-containing macroazo compound can be obtained.

In the formulae [3] and [4], $R^1$ to $R^4$, $A_1$, $A_2$, $T_1$, $T_2$, $Q_1$ to $Q_5$, p, q, r and s are as defined above; $Y_1$ and $Y_2$ represent independently a carboxyl group, a hydroxyl group, an amino group or an isocyanate group; and $W_1$ and $W_2$ represent independently groups reactive with $Y_1$ and $Y_2$ to form an ester linkage or an amido linkage. Thus, $Y_1$ and $Y_2$, and $W_1$ and $W_2$ form a combination of groups which can mutually react to form an ester linkage or an amido linkage. As examples of such a combination of groups, a combination in which one is a carboxyl group and the other is a hydroxyl group or an amino group; a combination in which one is a hydroxyl group and the other is a carboxyl group or an isocyanato group; a combination in which one is an amino group and the other is a carboxyl group; a combination in which one is an isocyanato group and the other is a hydroxyl group, and the like can be referred to.

The solvents usable in the reaction include, for example, ethers such as diethyl ether, diisopropyl ether, tetrahydrofuran, dioxane, dimethoxyethane and the like; halogenated hydrocarbons such as carbon tetrachloride, chloroform, methylene chloride, dichlorethane, trichlene, xylene haxafluoride and the like; hydrocarbons such as n-hexane, benzene, toluene, xylene and the like; esters such as ethyl acetate, butyl acetate, methyl propionate and the like; acetonitrile; N,N-dimethylformamide; and the like. These solvents may be used either singly or as a mixture thereof.

As the dehydrating agent, substances usable as a dehydrating-condensing agent can be used without limitation. Examples thereof include inorganic dehydrating agents such as concentrated sulfuric acid, diphosphorus pentoxide, anhydrous zinc chloride and the like; carbodiimides such as dicyclohexyl carbodiimide, diisopropyl carbodiimide, 1-ethyl-3-(3-dimethylaminopropylcarbodiimide) hydrochloride and the like; polyphosphoric acid, acetic anhydride, carbonyldiimidazole, p-toluenesulfonyl chloride and the like.

The amount of the dehydrating agent is not particularly limited. However, too small an amount of dehydrating agent makes the progress of reaction too slow, and too large an amount of the dehydrating agent deteriorates economy of the process. Accordingly, the dehydrating agent is used usually in an amount of 1–5 moles and preferably in an amount of 2–3 moles, per mole of the azo compound or the fluorine-containing ether compound.

The production mentioned above is preferably put into practice in the presence of a basic catalyst. Concrete examples of said basic catalyst include organic amines such as triethylamine, diisopropylethylamine, N,N-dimethylaniline, piperidine, pyridine, 4-dimethylaminopyridine, 1,5-diazabicyclo[4.3.0]nona-5-ene, 1,8-diazabicyclo[5.4.0]undec-7-ene, tri-n-butylamine, N-methylmorpholine and the like; metal hydrides such as sodium hydride and the like; and basic alkali metal compounds such as n-butyllithium, tert-butyllithium and the like.

The basic catalyst is used usually in an amount of 0.5–5 moles and preferably in an amount of 1–2 moles, per mole of the azo compound or the dehydrating agent.

In the production of the fluorine-containing macroazo compound of the present invention, the ratio between the azo compound and the fluorine-containing ether compound is not particularly limited, but it may be decided appropriately. Preferably, the above-mentioned two compounds are used in nearly equimolar amounts.

The reaction can be carried out in an inert gas atmosphere. As the inert gas, there can be used a nitrogen gas, an argon gas, etc.

The reaction temperature is not particularly limited. However, too high a reaction temperature causes a decomposition of the azo group and too low a reaction temperature reduces the reaction velocity and makes the reaction take a long period of time. Accordingly, the reaction temperature is usually selected from a temperature range of from −10° C. to 60° C. appropriately. If desired, the reaction temperature may be elevated stepwise from a low temperature. The reaction time may vary depending on other reaction conditions, and is usually selected from a range of 1–60 hours appropriately.

The objective product is isolated by an appropriate means in accordance with the kinds and amounts of starting materials, basic catalyst, dehydrating agent and solvent and the state of reaction mixture. For example, when the reaction mixture is a viscous liquid, the reaction mixture is diluted with an appropriate solvent and then the impurities are removed by the method of filtration or washing with water, after which the solvent is removed. In this manner, the objective fluorine-containing macroazo compound can be obtained.

As the compound represented by the formula [3] and the fluorine-containing ether compound represented by the formula [4] used as starting materials, any of commercial products and home-made products appropriately prepared by conventional methods may be used.

Since the fluorine-containing macroazo compound of the present invention easily generate radical species with evolution of nitrogen gas by cleavage of azo groups upon heating or photo-irradiation, polymerization proceeds rapidly even if any of various monomers are present together with the fluorine-containing macroazo compound.

The fluorine-containing macroazo compound of the present invention is characterized in that the molecule involves, as a constituent thereof, a fluorine-containing segment having a large quantity of fluorine atoms. If such a fluorine-containing macroazo compound is used as a macroazo initiator for production of a block polymer, the segment having a large quantity of fluorine atoms can be introduced into the resulting block polymer in a high efficiency.

Using the fluorine-containing macroazo compound of the present invention as a macroazo initiator, a fluorine-containing block polymer of the present invention can be produced, for example, in the following manner.

That is, the fluorine-containing macroazo compound represented by formula [1] which has been obtained in the above-mentioned manner and a monomer for example, that represented by the following formula [5]:

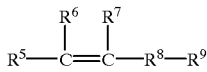

[5]

are subjected to a conventional polymerization reaction in an appropriate solvent or in an absence of solvent, and if desired in an atmosphere of an inert gas.

In the formula [5], $R^5$ represents a hydrogen atom, a lower alkyl group or a halogen atom; $R^6$ represents a hydrogen atom, a lower alkyl group, a halogen atom, a carboxyl group, an alkyloxycarbonyl group or a formyl group; $R^7$ represents a hydrogen atom, a lower alkyl group, a carboxyl group, an alkyloxycarbonyl group or a halogen atom; $R^8$ represents an alkylene group which may optionally have a double bond or represents a direct link; and $R^9$ represents a hydrogen atom, an alkyl group, a haloalkyl group, an aryl group, an aliphatic heterocyclic group, an aromatic heterocyclic group, a halogen atom, an alkyloxycarbonyl group, an aralkyloxycarbonyl group, a hydroxyalkyloxycarbonyl group, an aryloxycarbonyl group, an acyloxy group, a cyano group, a carboxyl group, a formyl group, an amino group, a sulfonic acid group, a carbamoyl group or a hydroxyl group.

The treatment after the reaction may be according to the conventional treatments employed in this field of the art.

If desired, a chain transfer agent such as laurylmercaptan, octylmercaptan, butylmercaptan, 2-mercaptoethanol, butyl thioglycolate or the like may be added at the time of carrying out the polymerization in order to control the molecular weight.

Conventional polymerization methods such as suspension polymerization, solution polymerization, bulk polymerization, emulsion polymerization, etc. can be used in the present invention. In these polymerization methods, the fluorine-containing macroazo compound may be used in combination with a conventional radical polymerization initiator such as azobisisobutyronitrile, dimethyl 2,2'-azobisisobutyrate or the like.

The monomer of the formula [5] is explained in more detail.

In the formula [5], as the halogen atom represented by $R^5$, $R^6$, $R^7$ and $R^9$, fluorine, chlorine, bromine, iodine and the like can be referred to. The lower alkyl group represented by $R^5$, $R^6$ and $R^7$ may be linear or branched chain lower alkyl groups, and as examples thereof, alkyl groups having 1–6 carbon atoms can be referred to. Specific examples thereof include a methyl group, an ethyl group, a n-propyl group, an isopropyl group, a n-butyl group, an isobutyl group, a tert-butyl group, a sec-butyl group, a n-pentyl group, an isopentyl group, a neopentyl group, a tert-pentyl group, a 3,3-dimethylbutyl group, a 1,1-dimethylbutyl group, a 1-methylpentyl group, a n-hexyl group, an isohexyl group and the like. The alkyloxycarbonyl group represented by $R^6$, $R^7$ and $R^9$ may be linear or branched chain alkyloxycarbonyl groups, which may optionally have a double bond. As examples of such alkyloxycarbonyl groups, alkyloxycarbonyl groups having 2–19 carbon atoms can be referred to. Specific examples thereof include a methyloxycarbonyl group, an ethyloxycarbonyl group, a propyloxycarbonyl group, a butyloxycarbonyl group, a pentyloxycarbonyl group, a hexyloxycarbonyl group, a heptyloxycarbonyl group, an octyloxycarbonyl group, a dodecyloxycarbonyl group, an octadecyloxycarbonyl group, an ethenyloxycarbonyl group, a propenyloxycarbonyl group, a butenyloxycarbonyl group, a tert-butyloxycarbonyl group, a 2-ethylhexyloxycarbonyl group and the like. The alkyl group represented by $R^9$ may be linear, branched chain or cyclic alkyl groups, which may optionally have a double bond. As such alkyl groups, alkyl groups having 1–20 carbon atoms can be referred to, for example. Specific examples thereof include a methyl group, an ethyl group, a n-propyl group, an isopropyl group, a n-butyl group, an isobutyl group, a tert-butyl group, a sec-butyl group, a pentyl group, an isopentyl group, a neopentyl group, a tert-pentyl group, a 3,3-dimethylbutyl group, a 1,1-dimethylbutyl group, a 1-methylpentyl group, a n-hexyl group, an isohexyl group, a heptyl group, an octyl group, a nonyl group, a decyl group, an undecyl group, a dodecyl group, a hexadecyl group, an octadecyl group, a cyclopropyl group, a cyclopentyl group, a cyclohexyl group, an ethenyl group, a propenyl group, a butenyl group, a pentenyl group, a hexenyl group, a heptenyl group, an octenyl group and the like. As examples of the haloalkyl group, haloalkyl groups having 1–20 carbon atoms formed by halogenation (for example, fluorination, chlorination, bromination or iodination) of the above-mentioned alkyl groups can be referred to. Specific examples thereof include a chloromethyl group, a bromomethyl group, a trifluoromethyl group, a 2-chloroethyl group, a 3-chloropropyl group, a 3-bromopropyl group, a 3,3,3-trifluoropropyl group, a 2-perfluorooctylethyl group, a perfluorooctyl group, a 1-chlorodecyl group, a 1-chlorooctadecyl group and the like. Examples of said aryl group include a phenyl group, a tolyl group, a xylyl group, a naphthyl group, an anthryl group, a 4-methylphenyl group, a 4-ethylphenyl group, a 4-methoxyphenyl group, a 4-vinylphenyl group, a 4-chlorophenyl group, an aminophenyl group, a hydroxyphenyl group, a carboxyphenyl group and the like. As said aliphatic heterocyclic group, for example, 5-membered and 6-membered aliphatic heterocyclic groups are preferred. As the hetero atom, nitrogen atom, oxygen atom, sulfur atoms and the like can be contained in a number of 1–3 atoms. Specific examples of the aliphatic heterocyclic group include a pyrrolidyl-2-one group, a piperidino group, a piperazinyl group, a morpholino group and the like. As said aromatic heterocyclic group, 5-membered and 6-membered aromatic heterocyclic groups are preferred. As the hetero atom, nitrogen atom, oxygen atom, sulfur atom and the like can be contained in a number of 1–3 atoms. Specific examples of such aromatic heterocyclic group include a pyridyl group, an imidazolyl group, a thiazolyl group, a furanyl group, a pyranyl group and the like. As examples of said aralkyloxycarbonyl group, aralkyloxycarbonyl groups having 8–20 carbon atoms can be referred to. Specific examples thereof include a benzyloxycarbonyl group, a phenethyloxycarbonyl group and the like. As said acyloxy group, acyloxy groups having 2–18 carbon atoms derived from carboxylic acids can be referred to. Specific examples thereof include acetyloxy group, propionyloxy group, butyryloxy group, pentanoyloxy group, hexanoyloxy group, heptanoyloxy group, octanoyloxy group, lauroyloxy group, stearoyloxy group, benzoyloxy group and the like. As said hydroxyalkyloxycarbonyl group, hydroxyalkyloxycarbonyl groups having 2–19 carbon atoms prepared by replacing the hydrogen atom of the above-mentioned alkyloxycarbonyl groups with hydroxyl group can be referred to. Specific examples thereof include a hydroxymethyloxycarbonyl group, a hydroxyethyloxycarbonyl group, a hydroxypropyloxycarbonyl group, a hydroxybutyloxycarbonyl group, a hydroxypentyloxycarbonyl group, a hydroxyhexyloxycarbonyl hydroxyhexyloxycarbonyl group, a hydroxyheptyloxycarbonyl group, a hydroxyoctyloxycarbonyl group, a hydroxydodecyloxycarbonyl group, a hydroxyoctadecyloxycarbonyl group and the like. As said aryloxycarbonyl group, for example, aryloxycarbonyl groups having 7–20 carbon atoms can be referred to. Specific examples thereof include a phenyloxycarbonyl group, a naphthyloxycarbonyl group and the like. The alkylene group represented by $R^8$, which may optionally have a double bond, may be linear or branched chain alkylene groups. As examples thereof, for example, alkylene groups having 1–10 carbon atoms can be referred to. As alkylene group having a double bond, the same alkylene groups as above, except that the double bond is present at an end or in the alkylene group chain in a number of one or more, preferably in a number of 1–5, and more preferably in a number of 1–3, can be referred to. Specific examples thereof include a methylene group, an ethylene group, a propylene group, a butylene group, a 2-methylpropylene group, a pentylene group, a 2,2-dimethylpropylene group, a 2-ethylpropylene group, a hexylene group, a heptylene group, an octylene group, a 2-ethylhexylene group, a nonylene group, a decylene group, an ethenylene group, a propenylene group, a butenylene group, a pentenylene group, a hexenylene group, a butadienylene group and the like, although the invention is by no means limited by these examples.

Specific examples of the monomers which can be used in the production of the fluorine-containing block polymer of the present invention are as follows:

ethylenic aromatic hydrocarbons having 8–20 carbon atoms such as styrene, 4-methylstyrene, 4-ethylstyrene, 4-methoxystyrene, divinylbenzene and the like;

vinyl esters having 3–20 carbon atoms such as vinyl formate, vinyl acetate, vinyl propionate, isopropenyl acetate and the like;

halogen-containing vinyl compounds having 2–20 carbon atoms such as vinyl chloride, vinylidene chloride, vinylidene fluoride, tetrafluoroethylene, tetrachloroethylene and the like;

ethylenic carboxylic acids having 3–20 carbon atoms such as acrylic acid, methacrylic acid, itaconic acid, maleic acid, fumaric acid, crotonic acid, citraconic acid, methaconic acid, vinylacetic acid, allylacetic acid, vinylbenzoic acid and the like (if desired, these acids may be in the form of a salt such as alkali metal salt including sodium salt and potassium salt or in the form of ammonium salt);

esters of ethylenic carboxylic acids having 4–20 carbon atoms such as methyl methacrylate, ethyl methacrylate, propyl methacrylate, butyl methacrylate, 2-ethylhexyl methacrylate, lauryl methacrylate, stearyl methacrylate, vinyl methacrylate, allyl methacrylate, phenyl methacrylate, benzyl methacrylate, methyl acrylate, ethyl acrylate, butyl acrylate, 2-ethylhexyl acrylate, lauryl acrylate, stearyl acrylate, vinyl acrylate, dimethyl itaconate, diethyl itaconate, dimethyl maleate, diethyl maleate, dimethyl fumarate, diethyl fumarate, methyl crotonate, ethyl crotonate, vinyl crotonate, dimethyl citraconate, diethyl citraconate, dimethyl methaconate, diethyl methaconate, methyl 3-butenoate, 2-hydroxyethyl methacrylate, 3-hydroxypropyl methacrylate, 2-hydroxypropyl methacrylate, 2-hydroxyethyl acrylate, 3-hydroxypropyl acrylate, 2-hydroxypropyl acrylate and the like;

cyano-containing vinyl compounds having 3–20 carbon atoms such as acrylonitrile, methacrylonitrile, allyl cyanide and the like;

vinylamide compounds having 3–20 carbon atoms such as acrylamide, methacrylamide and the like;

ethylenic aldehydes having 3–20 carbon atoms such as acrolein, crotonaldehyde and the like;

vinylsulfonic acids having 2–20 carbon atoms such as vinylsulfonic acid, 4-vinylbenzenesulfonic acid and the like (if desired, these acids may be in the form of a salt such as alkali metal salt including sodium salt, potassium salt and the like);

vinyl type aliphatic amines having 2–20 carbon atoms such as vinylamine, allylamine and the like;

vinyl type aromatic amines having 8–20 carbon atoms such as vinylaniline and the like;

vinyl type aliphatic heterocyclic amines having 5–20 carbon atoms such as N-vinylpyrrolidone, vinylpiperidine and the like;

vinyl type aromatic heterocyclic amines having 5–20 carbon atoms such as vinylpyridine, 1-vinylimidazole and the like;

ethylenic alcohols having 3–20 carbon atoms such as allyl alcohol, crotyl alcohol and the like;

ethylenic phenols having 8–20 carbon atoms such as 4-vinylphenol and the like;

diene compounds having 4–20 carbon atoms such as butadiene, isoprene and the like; etc.

These monomers may be used either singly or in proper combination thereof.

In the fluorine-containing block polymer of the present invention obtained by polymerizing monomers in the presence of the fluorine-containing macroazo compound of the present invention, the constitutional percentage of the units derived from the fluorine-containing macroazo compound is not particularly limited, but may be appropriately selected usually from a range of 1–99% by weight, preferably from a range of 5–95% by weight, and more preferably from a range of 10–90% by weight.

The constitutional percentages of the monomer units are not particularly limited, but the percentages may be selected usually from a range of 99–1% by weight, preferably from a range of 95–5% by weight and further preferably from a range of 90–10% by weight.

The concentrations of the fluorine-containing macroazo compound and the monomers at the time of polymerization are properly chosen so as to adjust the total concentrations of these components in the polymerization solution usually 5% (solvent 95%) to 100% by weight (in the absence of solvent), preferably 10–100% by weight.

The polymerization is preferably carried out in the presence of an organic solvent. The organic solvents which can be used include, for example, hydrocarbons such as toluene, xylene, benzene, cyclohexane, n-hexane, n-octane and the like; halogenated hydrocarbons such as methylene chloride, chloroform, carbon tetrachloride, dichloroethane, trichloroethane, xylene hexafluoride and the like; esters such as methyl acetate, ethyl acetate, n-butyl acetate, methyl propionate and the like; carboxylic acids such as fluoroacetic acid, trifluoroacetic acid, trifluoroacetic acid anhydride and the like; ketones such as acetone, methyl ethyl ketone, cyclohexanone and the like; cyclic ethers such as tetrahydrofuran, dioxane and the like; alcohols such as methanol, ethanol n-propanol, isopropanol, n-butanol, isobutanol, tert-butanol and the like; and N-methylpyrrolidone, N,N-dimethylacetamide, dimethyl sulfoxide and the like. These organic solvents may be used singly or as a mixture thereof. When the fluorine-containing polymer of the present invention is used as a base material for cosmetic, the use of an alcohol such as ethanol, isopropanol or the like as a solvent in the polymerization is preferable because the residual solvent exercises no influence on human body and the fluorine-containing polymer formed by reaction can directly be used as a base material for cosmetic.

The polymerization is preferably carried out in an atmosphere of an inert gas. As said inert gas, for example, nitrogen gas, argon gas or the like can be used.

The temperature of polymerization is not particularly limited. However, when the temperature is too low, the extent of decomposition of azo group is small so that the polymerization progresses too slowly; and when the temperature is too high, an excessive decomposition of azo group takes place so that the polymerization is difficult to control. Accordingly, the temperature of polymerization is appropriately selected usually from a range of 20–150° C. and preferably from a range of 40–120° C. The reaction time may vary depending on the reaction temperature, the kinds and concentrations of fluorine-containing macroazo compound and monomers and other reaction conditions, and may be appropriately selected usually from a range of 2–24 hours.

Molecular weight of the fluorine-containing block polymer thus obtained is not particularly limited. As expressed in terms of number average molecular weight, however, the molecular weight is usually 3,000 or more, preferably 5,000 to 2,000,000, and more preferably 10,000 to 1,500,000.

The content of fluorine in the fluorine-containing block polymer is appropriately selected usually from a range of 0.1–90% and preferably from a range of 1–75%.

Since high molecular compounds generally have complicated structures, the structure thereof cannot always be expressed by a single formula. If the fluorine-containing block polymer of the present invention is daringly expressed by a structural formula, the polymer may be expressed by, for example, the formula [6] mentioned below, because the polymerization is carried out by using the fluorine-containing macroazo compound comprising repeating units represented by general formula [1] as a macroazo initiator. Needless to say, the structural formula presented herein is not limitative:

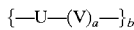

$$\{-U-(V)_a-\}_b \qquad [6]$$

wherein
U represents a fluorine-containing unit, V represents a monomer unit, "a" represents a natural number, b represents an integer of 2 or above, and { } embraces a random structure including various structures such as graft copolymer structure, block copolymer structure, etc.

In the formula [6], the fluorine-containing unit U derived from the fluorine-containing macroazo compound of the present invention can be represented by the formula:

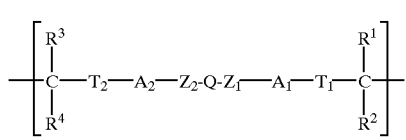

[1a]

wherein
$R^1$ through $R^4$, $A_1$, $A_2$, $Z_1$, $Z_2$, $T_1$, $T_2$ and Q are as defined above.

The monomer unit V derived from the monomer of the formula [5] can be represented by the formula:

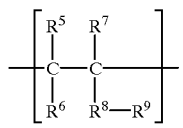

[5a]

wherein
$R^5$ through $R^9$ are as defined above.

The fluorine-containing block polymer thus obtained has excellent effects in water-repellency, oil-repellency, heat resistance, weather resistance, chemical resistance, dust-proofing property, adhesive property, etc., and therefore is expected to be useful as a polymer for resin compositions such as painting resin compositions, coating resin compositions and the like, or as a base material for cosmetics such as hair cosmetics (e.g., hair setting agent, hair treatment agent, etc.), fundamental cosmetics and the like, or as many other agents such as mold release agent, coating agent, surface modifier, medical therapeutic material, anti-adhesion agent, deodorant, etc.

When the monomer used in the fluorine-containing block polymer is a water-soluble compound, the block polymer obtained therefrom can be water-soluble and therefore can be used as a water-soluble paint or the like effectively. When the monomer is an oil-soluble compound, the fluorine-containing block polymer obtained therefrom is high in water-repellency and therefore is effectively usable as an oil-soluble coating material or the like.

When the fluorine-containing block polymer of the present invention is used as a polymer for resin compositions for use as a paint or a coating material, the solvents which can be used in the composition include, for example, aromatic hydrocarbons such as benzene, toluene, xylene and the like, ketones such as acetone, methyl ethyl ketone and the like, ethers such as diethyl ether, diisopropyl ether, tetrahydrofuran, dioxane, dimethoxyethane and the like, lower alcohols such as methanol, ethanol, n-propanol, isopropanol, butanol, sec-butanol and the like, esters such as ethyl acetate, butyl acetate, methyl propionate and the like, etc.

When the fluorine-containing block polymer of the present invention is put to use in the form of the above-mentioned resin compositions, other components may be added thereto, if necessary. The components which may be added include one or more pigments, fillers, aggregates, anti-foaming agents, plasticizers, anti-rusting agents, film-forming assistants, ultraviolet absorbers, thickeners, metal release agents, dyes and the like, though these are not limitative.

Some of the fluorine-containing block polymers of the present invention are excellent in solubility in water and ethanol, and have a possibility of exhibiting excellent functions necessary for a base material for hair cosmetics, such as moisture resistance, setting power, elasticity, flaking property, feeling, etc. when used as a base material for hair cosmetics.

When the fluorine-containing block polymer of the present invention is dissolved in a hydrophilic organic solvent and used as a base material for cosmetic compositions, the hydrophilic organic solvent can be selected from lower alcohols and glymes. Of these hydrophilic organic solvents, preferred are ethanol, isopropanol and the like from the viewpoint of influence on human body.

When the fluorine-containing block polymer of the present invention is used as a base material for cosmetics, other cosmetic components may be added so long as addition of such other components does not damage the function of the block polymer. Non-limitative examples of the components which may be added include one or more surfactants, fats and oils, sugars, acids, bases, buffering agents, salts, water, alcohols, protein derivatives, crude drugs, propellants, antiseptic bactericides, antioxidants, ultraviolet absorbers, sequestering agents, oxidizing agents, reducing agents, dyes, perfumes, and the like.

When the monomer used in the fluorine-containing block polymer of the present invention is a water-soluble compound, the fluorine-containing block polymer obtained therefrom is soluble in water or alcohol and expected to be useful as a base material for hair cosmetics including hair dressing compositions of set type, treatment type and the like and hair treatment agents having a volume-down effect. On the other hand, when the monomer used in the fluorine-containing block polymer of the present invention is an oil-soluble compound and the fluorine-containing block polymer obtained therefrom is used as a base material for hair cosmetics, a tough coating film is formed, which is expected to exhibit an effect that the superficial fluorine-containing segment improves water-repellency, surface gloss and easiness of washing off dirt.

Next, the present invention is explained in more detail by referring to Examples, Comparative Examples and Experimental Examples. The present invention is by no means limited by these examples.

EXAMPLE 1

In a solvent mixture consisting of 20 ml of m-xylene hexafluoride and 30 ml of methylene chloride were suspended 22.0 g of Fomblin E HO($C_2H_4$O)$CH_2$—$CH_2$—(O—$C_2F_4$)$_{11}$—(O—$CF_2$)$_{13}$—$CH_2$(O$C_2H_4$)OH, (trade name, fluorinated polyoxyalkylene having hydroxyl groups on both molecular terminals and having a weight average molecular weight of ca. 2,300, manufactured by Ausimont Co.), 5 g of dicyclohexyl carbodiimide (DCC), 1.2 g of 4-dimethylaminopyridine (DMAP) and 2.8 g of 4,4'-azobis (4-cyanopentanoic acid), and the reaction was carried out at 20–25° C. for 8 hours with stirring. After allowed to stand overnight, deposited crystals were filtered off, and the filtrate was poured into 500 ml of methanol to precipitate a fluorine-containing macroazo compound. The precipitate was collected by filtration and dried under reduced pressure to obtain 20.3 g (yield 84.5%) of the objective fluorine-containing macroazo compound.

$^1$H-NMR (δ ppm ((CF$_3$CO)$_2$O): 1.67 (s, 3H, C$\underline{H}_3$), 1.77 (s, 3H, C$\underline{H}_3$), 2.35–2.6 (m, 8H, N—C—C$\underline{H}_2$C$\underline{H}_2$—CO), 3.85 (brs, 8H, COO—C$\underline{H}_2$C$\underline{H}_2$O,O—C$\underline{H}_2$C$\underline{H}_2$), 4.30 (brs, 4H, COO—C$\underline{H}_2$CH$_2$)

IR: 1740 cm$^{-1}$ (COO), 1209 cm$^{-1}$ (—CF$_2$—).

EXAMPLE 2

Into 60 ml of m-xylene hexafluoride were mixed 5.0 g of the fluorine-containing macroazo compound obtained in Example 1 and 20 g of methyl methacrylate (hereinafter simply referred to as MMA), and then subjected to polymerization at 70° C. for 5 hours under a nitrogen stream. After the reaction, the reaction mixture was poured into one liter of methanol to precipitate a fluorine-containing block polymer. The polymer was collected by filtration and dried. Thus, 22.8 g (yield 91.1%) of the objective fluorine-containing block polymer was obtained as a white-colored bulky product. A GPC measurement revealed that number average molecular weight of this product was 59,400, the weight average molecular weight thereof was 126,000, and the product was a fluorine-containing block polymer having a degree of dispersion of 2.12. Hereinafter, this product is called "Polymer F1".

EXAMPLE 3

Polymerization was carried out just in the same manner as in Example 2, except that styrene was used in place of MMA. As a result, 21.0 g (yield 80.2%) of the objective fluorine-containing block polymer was obtained as a light yellow powdery product. Hereinafter, this product is called "Polymer F2".

EXPERIMENTAL EXAMPLE 1

One gram of Polymer F1 obtained in Example 2 was taken into a measuring flask. By adding chloroform, the polymer was dissolved, and the total volume was adjusted to 10 ml. Then, the solution thus obtained was cast on a glass dish to form a film. The film was dried under reduced pressure, and the contact angle with water was measured by means of FACE CONTACT-ANGLE METER CA-D (manufactured by Kyowa Interface Science Co., Ltd.). The results are shown in Table 1.

EXPERIMENTAL EXAMPLE 2

A film was prepared by casting just in the same manner as in Experiment Example 1, except that Polymer F2 was used in place of Polymer F1, and contact angle with water was measured. The results are shown in Table 1.

COMPARATIVE EXAMPLE 1

Polymerization was carried out in the same manner as in Example 2, except that 0.14 g of azobisisobutyronitrile (AIBN) was used in place of the 1.0 g of fluorine-containing macroazo compound obtained in Example 1. As a result, 43.7 g (yield 43.6%) of polymethyl methacrylate (hereinafter referred to as PMMA) was obtained as a white-colored bulky product. A GPC measurement revealed that number average molecular weight and weight average molecular weight of the product were 68,000 and 121,000, respectively, and the degree of dispersion was 1.77.

One gram of the PMMA thus obtained was taken into a measuring flask, and chloroform was added to dissolve the PMMA and adjust the total volume to 10 ml. The solution thus obtained was cast in a glass dish to form a film, and the contact angle with water was measured by means of FACE CONTACT-ANGLE METER CA-D (manufactured by Kyowa Interface Science Co., Ltd.). The results are shown in Table 1.

TABLE 1

| | Contact angle with water (°) | | Film- |
|---|---|---|---|
| Example No. | Film surface (Air side) | Glass surface (Glass side) | formability[1] |
| Experimental Example 1 | 106.5 | 94.6 | Good |
| Experimental Example 2 | 107.6 | 98.3 | Good |
| Comparative Example 1 | 74.3 | 68.7 | Good |

[1]Film-formability was evaluated by visually checking whether or not a uniform film was formed on the surface in each dish.

It is apparent from the results mentioned above that each of the films obtained in Experiment Examples 1 and 2 by casting in glass dish is improved in contact angle with water as compared with that of glass itself and therefore water-repellency of glass can be improved by the fluorine-containing polymer of the present invention. Further, it is also apparent that each of the films obtained in Experiment Examples 1 and 2 by casting the fluorine-containing block polymer of the present invention is greater in contact angle with water and higher in water repellency than the film obtained by casting the PMMA of Comparative Example 1, and therefore the fluorine-containing block polymer is explicitly superior to PMMA when used as a resin composition for paint and the like or as a base material for cosmetics.

EXPERIMENTAL EXAMPLE 3

Solubility Test

Polymer F1 obtained in Example 2 was taken into a measuring flask. By adding a variety of solvents thereto, solubility of the sample was tested. The results are shown in Table 2.

TABLE 2

| Solvent | Solubility |
|---|---|
| Acetone | Soluble |
| MEK[1] | Soluble |
| Chloroform | Soluble |
| Methylene chloride | Soluble |
| Ethyl acetate | Soluble |
| Toluene | Soluble |
| THF[2] | Soluble |
| Ph(CF$_3$)$_2$[3] | Insoluble |
| n-Hexane | Insoluble |
| Methanol | Insoluble |
| HFIP[4] | Soluble |

[1]MEK: Methyl ethyl ketone
[2]THF: Tetrahydrofuran
[3]Ph(CF$_3$)$_2$: Xylene hexafluoride
[4]HFIP: Hexafluoroisopropanol It is apparent from the results of Table 2 that the fluorine-containing block polymer of the present invention is excellent in solubility, whereas the prior polymers having fluorine segment have a problem in solubility.

As has been mentioned above, the present invention provides a fluorine-containing macroazo compound having a segment containing a large quantity of fluorine atoms in the molecule thereof. If a polymerization is carried out by using said fluorine-containing macroazo compound as a macroazo initiator, a large quantity of fluorine atoms can be introduced into the polymer in a high efficiency. Thus, the present invention can contribute to the industry greatly.

What is claimed is:

1. A process for producing a block polymer, which comprises polymerizing a monomer using a fluorine-containing macroazo compound as a polymerization initiator, the compound comprising repeating units represented by the following formula (1):

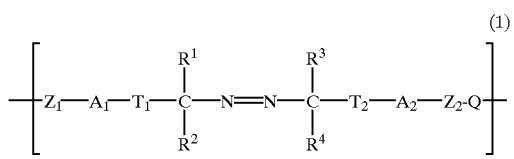

wherein
$R^1$ and $R^3$ independently represent a lower alkyl group;
$R^2$ and $R^4$ independently represent a lower alkyl group or a cyano group;
$A_1$ and $A_2$ independently represent a lower alkylene group which may contain one or more oxygen atoms and/or an aromatic ring;
$Z_1$ and $Z_2$ independently represent an ester linkage or an amido linkage;
$T_1$ and $T_2$ independently represent —CONH— or a direct link; and
Q represents a fluorine-containing segment.

2. A process according to claim 1, wherein the monomer is represented by the formula:

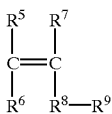

wherein
$R^5$ represents a hydrogen atom, a lower alkyl group or a halogen atom;
$R^6$ represents a hydrogen atom, a lower alkyl group, a halogen atom, a carboxyl group, an alkyloxycarbonyl group or a formyl group;
$R^7$ represents a hydrogen atom, a lower alkyl group, a carboxyl group, an alkyloxycarbonyl group or a halogen atom;
$R^8$ represents an alkylene group which may optionally have a double bond or represents a direct link; and
$R^9$ represents a hydrogen atom, an alkyl group, a haloalkyl group, an aryl group, an aliphatic heterocyclic group, an aromatic heterocyclic group, a halogen atom, an alkyloxycarbonyl group, an aralkyloxycarbonyl group, a hydroxyalkyloxycarbonyl group, an aryloxycarbonyl group, an acyloxy group, a cyano group, a carboxyl group, a formyl group, an amino group, a sulfonic acid group, a carbamoyl group or a hydroxyl group.

3. A fluorine-containing block polymer comprising as constituents thereof, units derived from the fluorine-containing macroazo compound and those derived from a monomer, wherein the compound comprises repeating units represented by the following formula (1):

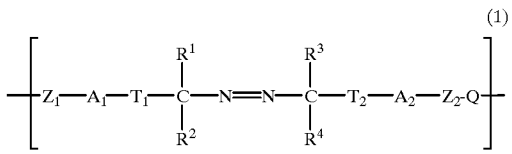

wherein
$R^1$ and $R^3$ independently represent a lower alkyl group;
$R^2$ and $R^4$ independently represent a lower alkyl group or a cyano group;
$A_1$ and $A_2$ independently represent a lower alkylene group which may contain one or more oxygen atoms and/or an aromatic ring;
$Z_1$ and $Z_2$ independently represent an ester linkage or an amido linkage;
$T_1$ and $T_2$ independently represent —CONH— or a direct link; and
Q represents a fluorine-containing segment.

4. A fluorine-containing block polymer according to claim 3, wherein the unit derived from the fluorine-containing macroazo compound is represented by the formula:

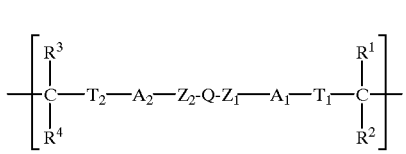

wherein
$R^1$ and $R^3$ independently represent a lower alkyl group;
$R^2$ and $R^4$ independently represent a lower alkyl group or a cyano group;
$A_1$ and $A_2$ independently represent a lower alkylene group which may contain one or more oxygen atoms and/or an aromatic ring;
$Z_1$ and $Z_2$ independently represent an ester linkage or an amido linkage;
$T_1$ and $T_2$ independently represent —CONH— or a direct link; and
Q represents a fluorine-containing segment.

5. A fluorine-containing block polymer according to claim 3, wherein the unit derived from a monomer is represented by the formula:

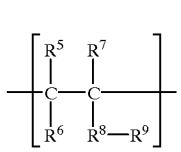

wherein
$R^5$ represents a hydrogen atom, a lower alkyl group or a halogen atom;
$R^6$ represents a hydrogen atom, a lower alkyl group, a halogen atom, a carboxyl group, an alkyloxycarbonyl group or a formyl group;

R[7] represents a hydrogen atom, a lower alkyl group, a carboxyl group, an alkyloxycarbonyl group or a halogen atom;

R[8] represents an alkylene group which may optionally have a double bond or represents a direct link; and R[9] represents a hydrogen atom, an alkyl group, a haloalkyl group, an aryl group, an aliphatic heterocyclic group, an aromatic heterocyclic group, a halogen atom, an alkyloxycarbonyl group, an aralkyloxycarbonyl group, a hydroxyalkyloxycarbonyl group, an aryloxycarbonyl group, an acyloxy group, a cyano group, a carboxyl group, a formyl group, an amino group, a sulfonic acid group, a carbamoyl group or a hydroxyl group, the unit derived from the fluorine-containing macroazo compound is represented by the formula:

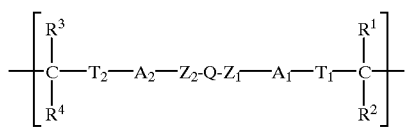

[1a]

wherein

R[1] and R[3] independently represent a lower alkyl group;

R[2] and R[4] independently represent a lower alkyl group or a cyano group;

$A_1$ and $A_2$ independently represent a lower alkylene group which may contain one or more oxygen atoms and/or an aromatic ring;

$Z_1$ and $Z_2$ independently represent an ester linkage or an amido linkage;

$T_1$ and $T_2$ independently represent —CONH— or a direct link; and

Q represents a fluorine-containing segment.

6. A process for using the block polymer of claim 3 for preparing a coating resin composition, or a painting resin composition.

7. A process for using the block polymer of claim 3 as a base material for preparing hair cosmetics or fundamental cosmetics.

\* \* \* \* \*

UNITED STATES PATENT AND TRADEMARK OFFICE
CERTIFICATE OF CORRECTION

PATENT NO. : 6,201,082 B1
DATED : March 13, 2001
INVENTOR(S) : Kazuo Shiraki; Nobutaka Shimamura It is certified that error appears in the above-identified patent and that said Letters Patent is hereby corrected as shown below:

<u>Title page,</u>
Replace item [30] as follows:
-- [30]  Foreign Application Priority Data
   May 31, 1996 (JP)..............................8-160838 --

Signed and Sealed this

Fourth Day of December, 2001

Attest:

NICHOLAS P. GODICI
Attesting Officer    Acting Director of the United States Patent and Trademark Office